(12) United States Patent
Bell, Jr. et al.

(10) Patent No.: US 9,135,142 B2
(45) Date of Patent: Sep. 15, 2015

(54) WORKLOAD PERFORMANCE PROJECTION FOR FUTURE INFORMATION HANDLING SYSTEMS USING MICROARCHITECTURE DEPENDENT DATA

(75) Inventors: Robert H. Bell, Jr., Austin, TX (US); Luigi Brochard, Paris (FR); Donald Robert DeSota, Liberty Hill, TX (US); Venkat R. Indukuru, Austin, TX (US); Rajendra D. Panda, Austin, TX (US); Sameh S. Sharkawi, College Station, TX (US)

(73) Assignee: International Business Machines Corporation, Armonk, NY (US)

( * ) Notice: Subject to any disclaimer, the term of this patent is extended or adjusted under 35 U.S.C. 154(b) by 1851 days.

(21) Appl. No.: 12/343,482

(22) Filed: Dec. 24, 2008

(65) Prior Publication Data

US 2010/0161282 A1    Jun. 24, 2010

(51) Int. Cl.
| | |
|---|---|
| *G06F 3/01* | (2006.01) |
| *G01C 7/00* | (2006.01) |
| *G01C 7/04* | (2006.01) |
| *G06F 3/00* | (2006.01) |
| *G06F 11/36* | (2006.01) |
| *G06F 11/34* | (2006.01) |

(52) U.S. Cl.
CPC ........ *G06F 11/3612* (2013.01); *G06F 11/3428* (2013.01); *G06F 11/3457* (2013.01); *G06F 11/3466* (2013.01); *G06F 2201/88* (2013.01)

(58) Field of Classification Search
CPC ...................................................... G06F 15/00
USPC .......... 702/60, 63, 66, 79, 84, 120, 136, 150, 702/152, 182, 186; 177/25.18; 358/473; 379/88.26; 709/230, 238
See application file for complete search history.

(56) References Cited

U.S. PATENT DOCUMENTS

| | | | |
|---|---|---|---|
| 4,266,270 A | | 5/1981 | Daniels |
| 4,694,920 A | * | 9/1987 | Naito et al. ................. 177/25.18 |

(Continued)

OTHER PUBLICATIONS

Anderson—"Continuous Profiling: Where Have All the Cycles Gone?"—Digital Equipment Corporation (Oct. 13, 1999).

(Continued)

*Primary Examiner* — Eliseo Ramos Feliciano
*Assistant Examiner* — Felix Suarez
(74) *Attorney, Agent, or Firm* — Stephen R. Tkacs; Stephen J. Walder, Jr.; Diana R. Gerhardt

(57) ABSTRACT

A performance projection system includes a test IHS and a currently existing IHS. The performance projection system includes surrogate programs and user application software. The test IHS employs a memory that includes a virtual future IHS, currently existing IHS, surrogate programs, and user application software for determination of runtime and HW counter performance data. The user application software and surrogate programs execute on the currently existing MS to provide designers with runtime data and HW counter or microarchitecture dependent data. Designers execute surrogate programs on the future IHS to provide runtime and HW counter data. Designers normalize and weight the runtime and HW counter data to provide a representative surrogate program for comparison to user application software performance on the future IHS. Using a scaling factor, designers may generate a projection of runtime performance for the user application software executing on the future IHS.

20 Claims, 8 Drawing Sheets

(56) References Cited

U.S. PATENT DOCUMENTS

| | | | | |
|---|---|---|---|---|
| 5,029,199 | A * | 7/1991 | Jones et al. | 379/88.26 |
| 5,263,153 | A | 11/1993 | Intrater | |
| 5,774,724 | A | 6/1998 | Heisch | |
| 5,938,760 | A | 8/1999 | Levine | |
| 5,961,654 | A | 10/1999 | Levine | |
| 6,047,367 | A | 4/2000 | Heller | |
| 6,085,338 | A | 7/2000 | Levine | |
| 6,629,097 | B1 | 9/2003 | Keith | |
| 6,833,936 | B1 * | 12/2004 | Seymour | 358/473 |
| 6,961,930 | B1 | 11/2005 | Waldsurger et al. | |
| 7,496,900 | B2 | 2/2009 | Dimpsey et al. | |
| 7,627,841 | B2 | 12/2009 | Shakouri et al. | |
| 7,644,397 | B2 | 1/2010 | Warren et al. | |
| 7,802,236 | B2 | 9/2010 | Calder et al. | |
| 7,805,533 | B2 * | 9/2010 | Burns et al. | 709/230 |
| 7,917,318 | B2 * | 3/2011 | Boerstler et al. | 702/66 |
| 7,962,644 | B1 * | 6/2011 | Ezerzer et al. | 709/238 |
| 2003/0048458 | A1 | 3/2003 | Micher et al. | |
| 2003/0078736 | A1 | 4/2003 | Weng | |
| 2004/0111708 | A1 | 6/2004 | Calder et al. | |
| 2005/0020278 | A1 | 1/2005 | Krumm et al. | |
| 2007/0061626 | A1 | 3/2007 | Nelson et al. | |
| 2008/0026493 | A1 | 1/2008 | Shakouri et al. | |
| 2008/0127149 | A1 | 5/2008 | Kosche et al. | |
| 2009/0193296 | A1 | 7/2009 | Kellington et al. | |
| 2010/0162216 | A1 * | 6/2010 | Bell et al. | 717/128 |

OTHER PUBLICATIONS

Annavaram—"The Fuzzy Correlation between Code and Performance Predictability"—Proceedings of the 37th International Symposium on Microarchitecture (2004).
Azimi—"Online Performance Analysis by Statistical Sampling of Microprocessor Performance Counters"—Proceedings of the 19th Annual International Conference on Supercomputing (2005).
Bhargava—"Improving Dynamic Cluster Assignment for Clustered Trace Cache Processor"—The University of Texas at Austin and 2003 Annual International Symposium on Computer Architecture (Jun. 2003).
Chen—"Nonlinear Adaptive Distance Metric Learning for Clustering"—Department of Computer Science and Engineering Arizona State University (Aug. 2007).
Eyerman—"A Performance Counter Architecture for Computing Accurate CPI Components"—Proceedings of the 12th International Conference on Architectural Support for Programming Languages and Operating Systems (2006).
Hamerly-1—"SimPoint 3.0: Faster and More Flexible Program Analysis"—Dept Computer Science and Engineering UC San Diego (Sep. 2005).
Hamerly-2—"How to Use SimPoint to Pick Simulation Points"—Dept Computer Science and Engineering UC San Diego (Mar. 2004).
Irwin—"The Best of Both Words—Delivering Aggregated Performance for High-Performance Math Libraries in Accelerated Systems"—Clear Speed Technology (Jun. 2007).
Lau-1—"Transition Phase Classification and Prediction"—11th International Symposium on High Performance Computer Architecture, Feb. 2005.
Lau-2—"The Strong Correlation Between Code Signatures and Performance"—IEEE International Symposium on Performance Analysis of Systems and Software, Mar. 2005.
Laurenzano—"Low Cost Trace-driven Memory Simulation Using SimPoint"—Workshop on Binary Instrumentation and Applications (held in conjunction with PACT2005), St. Louis, MO Sep. 2005.
Luo—"Automatically Selecting Representative Traces for Simulation Based on Cluster Analysis of Instruction Address Hashes"—The University of Texas at Austin IBM Server Group (2005).
Lyengar—"Representative Traces for Processor Models with Infinite Cache"—IBM Research Division presented at the International Symposium on High Performance Computer Architecture HPCA (2005).
Pereira—"Dynamic Phase Analysis for Cycle-Close Trace Generation"—International Conference on Hardware/Software Codesign and System Synthesis, Sep. 2005.
Perelman—"Picking Statistically Valid and Early Simulation Points"—Proceedings of the International Conference on Parallel Architectures and Compilation Techniques PACT (Sep. 2003.
Puzak—"An Analysis of the Effects of Miss Clustering on the Cost of a Cache Miss"—IBM SIGMICRO—(2007).
Robinson—"Initial Starting Point Analysis for K-Means clustering: A Case Study"—Proceedings of ALAR 2006 Conference on Applied Research in Information Technology (Mar. 2006).
Sherwood-1—"Basic Block Distribution Analysis to Find Periodic Behavior and Simulation Points in Applications" In Proceedings of the International Conference on Parallel Architectures and Compilation Techniques (PACT), Sep. 2001.
Sherwood-2—"Automatically Characterizing Large Scale Program Behavior"—Architectural Support for Programming Languages and Operating Systems ASPLOS at University of California, San Diego (2002).
Simpoint—"SimPoint Overview"—downloaded from http://www.cse.ucsd.edu/~calder/simpoint/phase_analysis.htm on Oct. 20, 2007.
Taufer—"Scalability and Resource Usage of an OLAP Benchmark on Cluster of PCs"—Proceedings of 14th Annual ACM Symposium on Parallel Algorithms and Architectures (2002).
Taylor—"The use of Process Clustering in Distributed-System Event Displays"—Proceeding of the 1993 CAS Conference (1993).
Wunderlich-1—"An Evaluation of Stratified Sampling of Microarchitecture Simulations"—Computer Architecture Laboratory ISCA-31 (Jun. 2004).
Wunderlich-2—"Smarts: Accelerating Microarchitecture Simulation via Rigorous Statistical Sampling"—International Symposium on Computer Architecture ISCA-30 (Jun. 2003).
Wunderlich-3—"TurboSmarts: Accurate Microarchitecture Simulation Sampling in Minutes"—Computer Architecture Lab at Carnegie Mellon CALCM (2004).
U.S. Appl. No. 12/343,467.
Final Office Action dated Feb. 15, 2013 for U.S. Appl. No. 12/343,467, 22 pages.
Notice of Allowance dated Apr. 29, 2013 for U.S. Appl. No. 12/343,467, 12 pages.
Response to Final Office Action filed with the USPTO on Apr. 24, 2013 for U.S. Appl. No. 12/343,467, 9 pages.
Office Action mailed Aug. 16, 2012, for U.S. Appl. No. 12/343,467, 28 pages.
Interview Summary mailed Nov. 20, 2012 for U.S. Appl. No. 12/343,467, 2 pages.
Response to Office Action filed Nov. 16, 2012, U.S. Appl. No. 12/343,467, 22 pages.

* cited by examiner

FIG. 2

RUNTIME PERFORMANCE DATA — 205

| | EXISTING IHS A — 210 | EXISTING IHS B — 220 | EXISTING IHS C — 230 | EXISTING IHS D — 240 | FUTURE SYSTEM — 245 |
|---|---|---|---|---|---|
| APPLICATION SOFTWARE — 260 | 10 | 20 | 5 | 30 | X |
| SURROGATE PROGRAM 1 — 270 | 15 | 15 | 10 | 40 | 20 |
| SURROGATE PROGRAM 2 — 280 | 5 | 11 | 2.5 | 14 | 55 |
| AGGREGATE OF SURROGATE PROGRAM 1 AND SURROGATE PROGRAM 2 — 290 | 2.5 | 6.3 | 3.3 | 10.4 | 14.7 |

NORMALIZED RUNTIME PERFORMANCE DATA — 305

| | EXISTING IHS A — 310 | EXISTING IHS B — 320 | EXISTING IHS C — 330 | EXISTING IHS D — 340 | FUTURE SYSTEM — 345 |
|---|---|---|---|---|---|
| APPLICATION SOFTWARE PERFORMANCE NORMALIZED TO EXISTING IHS A — 360 | 1 | 2 | 0.5 | 3 | XN |
| SURROGATE PROGRAM 1 PERFORMANCE NORMALIZED TO EXISTING IHS A — 370 | 1 | 1 | 0.33 | 2.7 | 1.33 |
| SURROGATE PROGRAM 2 PERFORMANCE NORMALIZED TO EXISTING IHS A — 380 | 1 | 2.2 | 0.5 | 2.8 | 11 |
| AGGREGATE OF SURROGATE PROGRAM 1 AND SURROGATE PROGRAM 2 PERFORMANCE NORMALIZED TO EXISTING IHS A — 390 | 1 | 2.5 | 1.3 | 4.2 | 5.9 |

350

RUNTIME PROJECTION METHOD

FIG. 5

PERFORMANCE DATA

| | EXISTING IHS A RUNTIME 515 | EXISTING IHS A CPI 520 | EXISTING IHS A L1 CACHE MISS RATE 530 | FUTURE SYSTEM RUNTIME 535 | FUTURE SYSTEM CPI 540 | FUTURE SYSTEM L1 CACHE MISS RATE 550 |
|---|---|---|---|---|---|---|
| APPLICATION SOFTWARE 560 | 15 | 2.5 | 2 | Z | BLANK/NULL | BLANK/NULL |
| SURROGATE PROGRAM 1 570 | 20 | 4 | 1 | 30 | 3 | 2 |
| SURROGATE PROGRAM 2 580 | 10 | 2 | 4 | 20 | 1 | 1 |
| AGGREGATE OF SURROGATE PROGRAM 1 AND SURROGATE PROGRAM 2 590 | 15 | 3 | 2.5 | 25 | 2 | 1.5 |

NORMALIZED PERFORMANCE DATA

| | EXISTING IHS A RUNTIME | EXISTING IHS A CPI | EXISTING IHS A L1 CACHE MISS RATE | FUTURE SYSTEM RUNTIME | FUTURE SYSTEM CPI | FUTURE SYSTEM L1 CACHE MISS RATE |
|---|---|---|---|---|---|---|
| APPLICATION SOFTWARE | 1 | 0.2 | 0.1 | ZN | BLANK/NULL | BLANK/NULL |
| SURROGATE PROGRAM 1 | 1 | 0.2 | 0.1 | 1.5 | 0.2 | 0.1 |
| SURROGATE PROGRAM 2 | 1 | 0.2 | 0.4 | 2 | 0.1 | 0.1 |
| AGGREGATE OF SURROGATE PROGRAM 1 AND SURROGATE PROGRAM 2 | 1 | 0.2 | 0.2 | 1.7 | 0.1 | 0.1 |

WORKLOAD PERFORMANCE PROJECTION FOR FUTURE INFORMATION HANDLING SYSTEMS USING MICROARCHITECTURE DEPENDENT DATA

CROSS REFERENCE TO RELATED PATENT APPLICATIONS

This patent application relates to the U.S. Patent Application entitled "WORKLOAD PERFORMANCE PROJECTION VIA SURROGATE PROGRAM ANALYSIS FOR FUTURE INFORMATION HANDLING SYSTEMS", inventors Bell, et al., U.S. application Ser. No. 12/343,467, the disclosure of which is incorporated herein by reference in its entirety.

BACKGROUND

The disclosures herein relate generally to information handling systems (IHSs), and more specifically, to workload projection methods that IHSs employ.

Customers, designers and other entities may desire to know how their software applications, or workloads, will perform on future IHSs before actual fabrication of the future IHSs. Benchmark programs provide one way to assist in the prediction of the performance of a workload of a future IHS. However, aggregated performance over many benchmarks may result in errors in performance projections for individual software applications on a future IHS. An IHS may operate as an electronic design test system to develop workload performance projections for new processors and other new devices in future IHSs.

SUMMARY

In one embodiment, a method of performance testing is disclosed. The method includes selecting an existing information handling system (IHS), thus providing a selected existing IHS. The method also includes providing a user software program and first and second surrogate software programs. The method further includes executing the user software program on the selected existing IHS, thus producing a runtime result and a microarchitecture dependent data result. The method still further includes executing the multiple surrogate programs on the selected existing IHS to generate a runtime result and a microarchitecture data dependent result. The method also includes executing the multiple surrogate programs on a future IHS virtualization of the future IHS, each of the multiple surrogate programs exhibiting a respective runtime performance result. The method further includes determining a projected runtime result for the executing of the user software program on the future IHS from runtime results and microarchitecture data dependent results of executing the multiple surrogate programs on the selected existing IHS and the runtime performance results of executing the multiple surrogate programs on the virtualization of the future IHS.

In another embodiment, a performance projection system is disclosed that includes a currently existing information handling systems (IHS). The performance projection system also includes a test information handling system (IHS). The test IHS includes a processor and a memory coupled to the processor. The memory stores a future virtualized IHS. The performance projection system also includes a user application program that executes on the currently existing IHS. The performance projection system includes first and second surrogate programs that execute on the currently existing IHS and the future virtualized IHS. The test IHS is configured to store a runtime result and a microarchitecture dependent data result as the user software program executes on the currently existing IHS. The test IHS is also configured to store runtime data for the first surrogate software program as the first surrogate software program executes on the currently existing IHS and the future virtualized IHS. The test IHS is further configured to store runtime data for the second surrogate software program as the second surrogate program executes on the currently existing IHS and the future virtualized IHS. The test IHS is still further configured to normalize the runtime data for the user software program and the first and second surrogate software programs with respect to runtime data of the currently existing IHS, thus providing normalized runtime data. The test IHS is also configured to compare the normalized runtime data for the first and second surrogate software programs with respect to the normalized runtime data of the user software program to determine a best fit surrogate software program.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2 depicts runtime performance data for test user application software and surrogate programs on multiple hardware systems.

FIG. 3 is a normalized representation of the data runtime performance data of FIG. 2.

FIG. 5 is a representation of performance data including runtime and hardware counter microarchitecture dependent information for test user application software and multiple surrogate programs executing on an existing IHS and a future IHS.

FIG. 6 is a normalized representation of the performance data including runtime and hardware counter microarchitecture dependent information of FIG. 5.

DETAILED DESCRIPTION

Figure 1:
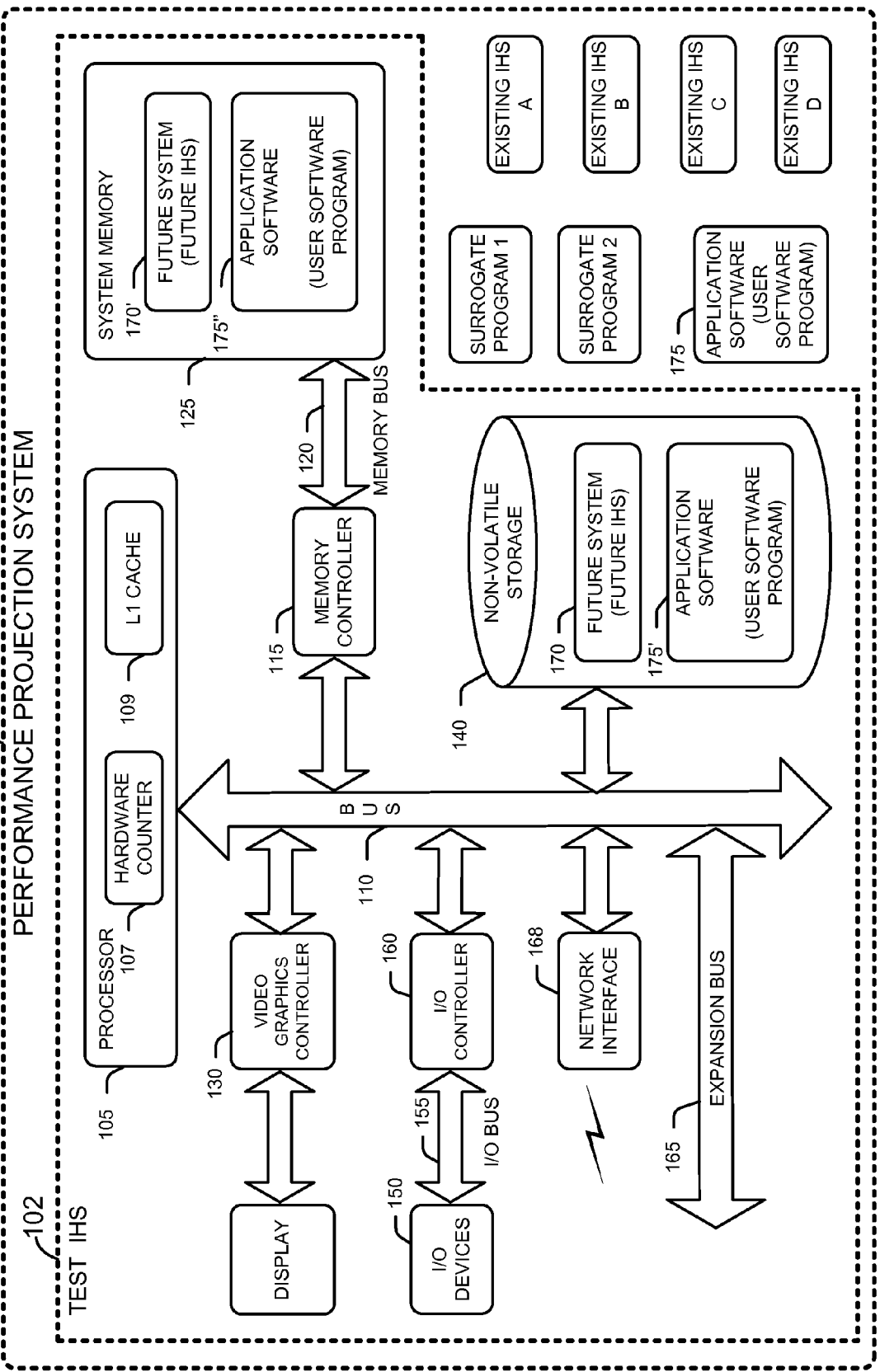
FIG. 1 is a block diagram of a test information handling system that executes test user application software on existing and future hardware systems.

In one embodiment, a performance projection system provides workload performance projection capability for IC designs or hardware (HW) designs under test. These hardware designs may themselves be information handling systems (IHSs). Designers execute application software, such as user application software, as a workload on multiple existing HW designs or existing systems (IHSs). Designers also execute multiple surrogate programs on the multiple existing systems. Surrogate programs include programs that exercise a HW system's functionality, such as benchmark programs for example. Designers or other entities may select surrogate programs that exhibit performance characteristics similar to those of the user application software.

Runtime data, or the amount of time that the application software and each of multiple surrogate programs takes to complete execution, provides a basis for comparison among the multiple existing HW systems or existing IHSs. In a simulation environment, each of the multiple surrogate programs executes on a virtualized future HW design model or future IHS, i.e. a future system. The projected surrogate program runtime data on the virtualized future system enables a comparison with respect to multiple existing systems. That particular comparison may provide for a normalization of data between surrogate program runtime performance on existing systems and that of the virtualized future system. The normalization data provides a way to predict the runtime performance of the application software, or workload, on the future system.

In another embodiment, a performance projection system provides microarchitecture dependent workload performance projection capability for a future hardware (HW) design model or virtualized future IHS under test. Designers or other entities select an existing hardware HW design or existing IHS that most closely resembles the hardware functionality or other criteria of the virtualized future system or future IHS. The virtualized future IHS executes on a test IHS within the performance projection system. Designers execute benchmark software such as user application software on the selected existing IHS. During user application execution, the test IHS records runtime and other hardware counter data. Hardware counter data includes microarchitecture dependent information. Designers select surrogate programs that exhibit similar performance characteristics to those of the user application software. Surrogate programs include programs that exercise an existing IHS's functionality, such as benchmark programs for example. Runtime data, or the amount of time that the application software and each of multiple surrogate programs takes to complete execution, provides a basis for comparison among the multiple existing IHSs. In a simulation environment, each of the multiple surrogate programs runs on a particular future HW design model or virtualized future IHS, i.e. a future system.

Designers or other entities execute the surrogate programs on the selected existing IHS and the virtualized future IHS, collecting runtime and HW counter performance data during execution. A normalization of that performance data, including runtime and HW counter data, allows designers and other entities to select a surrogate program that most closely fits the performance characteristics similar to those of the user application software. Designers and other entities use microarchitecture dependent information as selection criteria to determine the closest fit surrogate program for the user application software performance. Using a scaling process, the surrogate program runtime results provide an offset to generate a performance projection of user application software runtime performance on the future system.

FIG. 1 depicts a performance projection system 100, that integrated circuit (IC) designers and other entities may employ as a benchmarking tool for existing or new IC designs. Performance projection system 100 includes a test IHS 102 having a processor 105 that includes a hardware (HW) counter 107 and an L1 cache 109. Processor 105 couples to a bus 110. A memory controller 115 couples a system memory 125 to bus 110 via a memory bus 120. A video graphics controller 130 couples a display 135 to bus 110. Test IHS 102 includes nonvolatile storage 140, such as a hard disk drive, CD drive, DVD drive, or other nonvolatile storage that couples to bus 110 to provide test system 100 with permanent storage of information. System memory 125 and nonvolatile storage 140 are each a form of data store. I/O devices 150, such as a keyboard and a mouse pointing device, couple via I/O bus 155 and an I/O controller 160 to bus 110. Processor 105, system memory 125 and devices coupled to bus 110 together form test IHS 102 within performance projection system 100.

One or more expansion busses 165, such as USB, IEEE 1394 bus, ATA, SATA, PCI, PCIE and other busses, couple to bus 110 to facilitate the connection of peripherals and devices to test system 100. A network interface 168 couples to bus 110 to enable test IHS 102 to connect by wire or wirelessly to other network devices. Test IHS 102 may take many forms. For example, this IHS may take the form of a desktop, server, portable, laptop, notebook, or other form factor computer or data processing system. Test IHS 102 may also take other form factors such as a personal digital assistant (PDA), a gaming device, a portable telephone device, a communication device or other devices that include a processor and memory. Test system 100 includes benchmark software, or other software such as SURROGATE PROGRAM 1, and SURROGATE PROGRAM 2. Test system 100 includes existing hardware IHSs, such as an EXISTING IHS A, an EXISTING IHS B, an EXISTING IHS C, and an EXISTING IHS D.

A user or other entity installs software such as FUTURE SYSTEM 170 in non-volatile storage 140 of test IHS 102 prior to conducting testing with APPLICATION SOFTWARE 175. APPLICATION SOFTWARE 175 may be user application software for which it is desirable to determine performance on a FUTURE SYSTEM 170. While FIG. 1 shows APPLICATION SOFTWARE 175 as installed APPLICATION SOFTWARE 175' within nonvolatile storage 140 and as APPLICATION SOFTWARE 175" in memory 125, performance projection system 100 may execute APPLICATION SOFTWARE 175 on multiple existing IHSs, namely an EXISTING IHS A, an EXISTING IHS B, an EXISTING IHS C, and an EXISTING IHS D, as described in more detail below. FUTURE SYSTEM 170 is a virtual representation of a future hardware system or design, for example a future IHS. FUTURE SYSTEM 170 may take the form of a software emulation or virtualization of a future hardware system or future IHS.

The designation, FUTURE SYSTEM 170', describes FUTURE SYSTEM 170 after test system 100 loads the FUTURE SYSTEM 170 software into system memory 125 for execution or analysis. A user or other entity installs software such as APPLICATION SOFTWARE 175 in non-volatile storage 140 of test IHS 102 prior to conducting testing. APPLICATION SOFTWARE 175 acts as workload software, namely a workload. The designation, APPLICATION SOFTWARE 175", describes APPLICATION SOFTWARE 175 after test system 100 loads the APPLICATION SOFTWARE 175' from storage 140 into system memory 125 for execution. A user may load programs, such as SURROGATE PROGRAM 1 and SURROGATE PROGRAM 2 into non-volatile storage 140 for execution within test IHS 102 during simulation of FUTURE SYSTEM 170.

FIG. 2 depicts runtime performance data for APPLICATION SOFTWARE 175 and surrogate programs, such as SURROGATE PROGRAM 1 and SURROGATE PROGRAM 2, on multiple HW designs or existing HW systems (IHSs), such as EXISTING IHS A, EXISTING IHS B, EXISTING IHS C, SYSTEM D 196. Existing HW systems include EXISTING IHS A, EXISTING IHS B, EXISTING IHS C, and EXISTING IHS D. A designer or other entity may select an existing system, such as EXISTING IHS A, EXISTING IHS B, EXISTING IHS C and EXISTING IHS D for testing purposes. In one embodiment, designers or other entities may select each existing system to represent a hardware construction similar to FUTURE SYSTEM 170. For example, EXISTING IHS A may be an existing HW design of a previous design model of FUTURE SYSTEM 170. EXISTING IHS B may be an existing HW design that employs a hardware design or structure similar to FUTURE SYSTEM 170. A designer may select the existing systems, namely EXISTING IHS A, EXISTING IHS B, EXISTING IHS C and EXISTING IHS D, for hardware or software commonality with respect to FUTURE SYSTEM 170, or for other criteria.

Designers or other entities may load and execute multiple application software or surrogate programs, shown in column 205 on EXISTING IHS A, and the results are shown in column 210 of FIG. 2. As shown in column 205, multiple programs, namely APPLICATION SOFTWARE 175, SURROGATE PROGRAM 1, and SURROGATE PROGRAM 2 provide software for execution in system 100. The runtime performance data of FIG. 2 is a number that demonstrates the time that a particular software application or surrogate program consumes as it runs from start to finish. In other words, the runtime performance data is the amount of execution time for each application software or surrogate program. That runtime may be days, hours, or any other time measurement for comparison purposes.

Column 210 of FIG. 2 shows runtime performance data results for EXISTING IHS A. For example, APPLICATION SOFTWARE 175 executing on EXISTING IHS A generates a runtime performance data result of 10, as shown in row 260, column 210. Designers may select surrogate programs for many reasons, such as similarity to application software, standard industry benchmarking software, or other reasons. SURROGATE PROGRAM 1 executing on EXISTING IHS A generates a runtime performance data result of 15, as shown in row 270, column 210. SURROGATE PROGRAM 2 executing on EXISTING IHS A generates a runtime performance data result of 5, as shown in row 280, column 210.

Column 220 shows runtime performance data results for EXISTING IHS B. For example, APPLICATION SOFTWARE 175 executing on EXISTING IHS B generates a runtime performance data result of 20, as shown in row 260, column 220. The SURROGATE PROGRAM 1 executing on EXISTING IHS B generates a runtime performance data result of 15, as shown in row 270, column 220. SURROGATE PROGRAM 2 executing on EXISTING IHS B generates a runtime performance data result of 11, as shown in row 280, column 220. Column 230 shows runtime performance data results for EXISTING IHS C are shown in. For example, APPLICATION SOFTWARE 175 executing on EXISTING IHS C generates a runtime performance data result of 5, as shown in row 260, column 230. SURROGATE PROGRAM 1 executing on EXISTING IHS C generates a runtime performance data result of 10, as shown in row 270, column 230. SURROGATE PROGRAM 2 executing on EXISTING IHS C generates a runtime performance data result of 2.5, as shown in row 280, column 230.

Column 240 shows runtime performance data results for IHS D. For example, APPLICATION SOFTWARE 175 executing on EXISTING IHS D generates a runtime performance data result of 30, as shown in row 260, column 240. SURROGATE PROGRAM 1 executing on EXISTING IHS D generates a runtime performance data result of 40, as shown in row 270, column 240. SURROGATE PROGRAM 2 executing on EXISTING IHS D generates a runtime performance data result of 14, as shown in row 280 and column 240. System 100 executes FUTURE SYSTEM 170 in a simulation environment. In other words, FUTURE SYSTEM 170 represents a software or virtual representation of a future hardware IHS or future system. Test IHS 102 of system 100 executes FUTURE SYSTEM 170 in a virtual environment and produces runtime performance data as output.

Column 245 shows runtime performance data results for FUTURE SYSTEM 170. For example, SURROGATE PROGRAM 1 executing on FUTURE SYSTEM 170 in test IHS 102 generates a runtime performance data result of 20, as shown in row 270, column 245. SURROGATE PROGRAM 2 executing on FUTURE SYSTEM 170 generates a runtime performance data result of 55, as shown in row 280, column 245. Application software is typically relatively large or many lines of code in length. Designers may decide to not execute APPLICATION SOFTWARE 175 on FUTURE SYSTEM 170 because that may require extensive amounts of simulation time or runtime on a test IHS, such as test IHS 102. In this case, APPLICATION SOFTWARE 175 executing on FUTURE SYSTEM 170 as shown in row 260, column 245 is unknown at this time. The determination of the "X" value, namely the runtime performance projection for APPLICATION SOFTWARE 175 on a future IHS, is described below.

Row 290 of FIG. 2 shows an aggregate of surrogate program runtime performance data. Aggregate programs, such as aggregate of runtime performance data of SURROGATE PROGRAM 1 and SURROGATE PROGRAM 2 provide one method to generate more runtime performance data for analysis. In other words, the results of SURROGATE PROGRAM 1 and SURROGATE PROGRAM 2 runtime performance data provide input into the generation of aggregate results as shown in row 290. Designers may use a sum, geometric mean, host fraction, or other technique to generate aggregate of runtime performance data of SURROGATE PROGRAM 1 and SURROGATE PROGRAM 2 data. In one example, designers or other entities generate an aggregate of SURROGATE PROGRAM 1 and SURROGATE PROGRAM 2 runtime performance data as shown in row 290 of FIG. 2. For example, row 290, column 210 shows aggregate of SURROGATE PROGRAM 1 and SURROGATE PROGRAM 2 runtime performance data executing on EXISTING IHS A as a value 2.5. Aggregate of SURROGATE PROGRAM 1 and SURROGATE PROGRAM 2 runtime performance data executing on EXISTING IHS B is 6.3, as shown in row 290, column 220.

Aggregate of SURROGATE PROGRAM 1 and SURROGATE PROGRAM 2 runtime performance data executing on EXISTING IHS C is 3.3, as shown in row 290, column 230. Aggregate of SURROGATE PROGRAM 1 and SURROGATE PROGRAM 2 runtime performance data executing on SYSTEM D 196 is 10.4, as shown in row 290, column 240. Aggregate of SURROGATE PROGRAM 1 and SURROGATE PROGRAM 2 runtime performance data executing on FUTURE SYSTEM 170 is 14.7 as shown in row 290, column 245. Designers may select more surrogate programs, such as benchmark software programs (not shown), than FIG. 2 depicts. In other words, while FIG. 2 shows two surrogate programs, the runtime performance data may includes data from more than two surrogate programs. Designers may generate multiple other aggregates of combinations of surrogate programs (not shown) to provide more runtime performance data for further analysis.

FIG. 3 depicts runtime performance data that a designer or other entity normalizes during analysis of runtime performance data, such as that of FIG. 2. The normalized runtime performance data includes APPLICATION SOFTWARE 175 performance normalized to EXISTING IHS A, and SURROGATE PROGRAM 1 performance normalized to EXISTING IHS A. The normalized runtime performance data also includes SURROGATE PROGRAM 2 performance normalized to EXISTING IHS A, and the aggregate of runtime performance data of SURROGATE PROGRAM 1 and SURROGATE PROGRAM 2 performance normalized to EXISTING IHS A, as shown in column 310.

Row 350 shows the normalized runtime performance data for multiple system types, namely EXISTING IHS A, EXISTING IHS B, EXISTING IHS C, EXISTING IHS D, and FUTURE SYSTEM 170. A designer may normalize runtime performance data per FIG. 2 by identifying one system, such as EXISTING IHS A, to normalize all other data against. In one embodiment, the designer or other entity normalizes all data for EXISTING IHS A from column 210 in FIG. 2 to all 1's. For example the APPLICATION SOFTWARE 175 runtime performance data per FIG. 2 row 260, column 210 shows a particular data value of 10 or a normalization base value equal to 10. The designer normalizes the data value of APPLICATION SOFTWARE 175 runtime performance to EXISTING IHS A by dividing that particular value of 10 by itself and thus generating a data value of 1, as shown in row 360, column 310 of FIG. 3.

The designer or other entity normalizes all the remaining data for APPLICATION SOFTWARE 175 in row 360 using the particular normalization base value of 10 in this example. The designer normalizes all data for APPLICATION SOFTWARE 175 by dividing the data as shown in FIG. 2, row 260 by the particular normalization base value of 10. Each value in row 360 of FIG. 3 is the same data as row 260 of FIG. 2 divided by 10, and this provides the APPLICATION SOFTWARE 175 performance normalized to EXISTING IHS A data. For example, the APPLICATION SOFTWARE 175 performance normalized to EXISTING IHS A for EXISTING IHS B is equal to 20 divided by 10 or a normalized runtime performance data value of 2, as shown in row 360, column 320. The APPLICATION SOFTWARE 175 performance normalized to EXISTING IHS A for EXISTING IHS C is equal to 5 divided by 10 or a normalized runtime performance data value of 0.5 as shown in row 360, column 330.

The APPLICATION SOFTWARE 175 performance normalized to EXISTING IHS A for SYSTEM D 196 is equal to 30 divided by 10 or a normalized runtime performance data value of 3 as shown in row 360, column 340. In this manner, a designer determines the complete normalized runtime performance data for APPLICATION SOFTWARE 175 performance normalized to EXISTING IHS A as shown in FIG. 3, row 360. However, the lack of data for APPLICATION SOFTWARE running on FUTURE SYSTEM 170 inhibits the generation of FUTURE SYSTEM 170 data as yet in row 360, column 345. The determination of APPLICATION SOFTWARE running on FUTURE SYSTEM 170 "X" and APPLICATION SOFTWARE 175 performance normalized to EXISTING IHS A "XN" is described in more detail below.

The designer or other entity also normalizes the runtime performance data of SURROGATE PROGRAM 1 running on EXISTING IHS A to "1". In this example, the SURROGATE PROGRAM 1 runtime performance data per FIG. 2 row 270, column 210 shows a particular data value of 15. The designer normalizes this data by dividing that particular value of 15 by itself and thus generates a value of 1 for the data of row 370, column 310 of FIG. 3. In other words, the normalized data value for SURROGATE PROGRAM 1 performance normalized to EXISTING IHS A is equal to 1, as shown per row 370, column 310. The designer normalizes all the remaining data for SURROGATE PROGRAM 1 in row 370 using that particular value of 15. In other words, the designer normalizes all data for SURROGATE PROGRAM 1 by dividing the data as shown in FIG. 2, row 270 by the particular data value of 15.

Each value in row 370 of FIG. 3 is the same data as row 270 of FIG. 2 divided by 15. This division process results in the SURROGATE PROGRAM 1 performance normalized to EXISTING IHS A data of FIG. 3. For example, the SURROGATE PROGRAM 1 performance normalized to EXISTING IHS A for EXISTING IHS B is equal to 15 divided by 15 or a normalized runtime performance data result of 1 as shown in row 370, column 320. The SURROGATE PROGRAM 1 performance normalized to EXISTING IHS A for EXISTING IHS C is equal to 10 divided by 15 or a normalized runtime performance data result of approximately 0.33, as shown in row 370, column 330. The SURROGATE PROGRAM 1 performance normalized to EXISTING IHS A for EXISTING IHS D is equal to 40 divided by 15 or a normalized runtime performance data value of approximately 2.7, as shown in row 370, column 340. The SURROGATE PROGRAM 1 performance normalized to EXISTING IHS A for FUTURE SYSTEM 170 is equal to 20 divided by 15 or a normalized runtime performance data value of approximately 1.33, as shown in row 370, column 345.

The designer or other entity also normalizes the runtime performance data value of SURROGATE PROGRAM 2 running on EXISTING IHS A to "1". In this example, the SURROGATE PROGRAM 2 runtime performance data value per FIG. 2 row 280, column 210 shows a particular data value of 5. The designer normalizes this data by dividing that particular value of 5 by itself and thus generates a value of 1 for the data of row 380, column 310 of FIG. 3. In other words, the normalized data value for SURROGATE PROGRAM 2 performance normalized to EXISTING IHS A is equal to 1, as shown in row 380, column 310. The designer normalizes all the remaining data for SURROGATE PROGRAM 2 in row 380 using that particular divisor value of 5. The designer normalizes all data for SURROGATE PROGRAM 1 by dividing the data as shown in FIG. 2, row 280 by the particular data value of 5.

Each value in row 380 of FIG. 3 is the same data as row 280 of FIG. 2 divided by 5, generating the SURROGATE PROGRAM 2 performance normalized to EXISTING IHS A data of FIG. 3. For example, the SURROGATE PROGRAM 2 performance normalized to EXISTING IHS A for EXISTING IHS B is equal to 11 divided by 5 or a normalized runtime performance data result of 2.2 as shown in row 380, column 320. The SURROGATE PROGRAM 2 performance normalized to EXISTING IHS A for EXISTING IHS C is equal to 2.5 divided by 5 or a normalized runtime performance data result of 0.5, as shown in row 380, column 330. The SURROGATE PROGRAM 2 performance normalized to EXISTING IHS A for EXISTING IHS D is equal to 14 divided by 5 or a normalized runtime performance data value of approximately 2.8, as shown in row 380, column 340. The SURROGATE PROGRAM 2 performance normalized to EXISTING IHS A for FUTURE SYSTEM 170 is equal to 55 divided by 5 or a normalized runtime performance data value of 11, as shown in row 380, column 345.

The designer or other entity normalizes the runtime performance data of aggregate of runtime performance data of SURROGATE PROGRAM 1 and SURROGATE PROGRAM 2 running on EXISTING IHS A to "1". In this example, the aggregate of SURROGATE PROGRAM 1 and SURROGATE PROGRAM 2 runtime performance data per FIG. 2 row 290, column 210 shows a particular data value of 2.5. The designer normalizes this data by dividing that particular value of 2.5 by itself and thus generates a value of 1 for the data of row 390, column 310 of FIG. 3. In other words, the normalized data value for aggregate of runtime performance data of SURROGATE PROGRAM 1 and SURROGATE PROGRAM 2 performance normalized to EXISTING IHS A is equal to 1, as shown per row 390, column 310. The designer normalizes all the remaining data for aggregate of runtime performance data of SURROGATE PROGRAM 1 and SURROGATE PROGRAM 2 in row 390 using that particular value of 2.5. The designer normalizes all data for SURROGATE PROGRAM 1 by dividing the data as shown in FIG. 2, row 290 by the particular data value of 2.5.

Each value in row 390 of FIG. 3 is the same data as row 290 of FIG. 2 divided by 2.5. This division process, results in the aggregate of runtime performance data of SURROGATE PROGRAM 1 and SURROGATE PROGRAM 2 normalized to EXISTING IHS A data of FIG. 3. For example, the aggregate of SURROGATE PROGRAM 1 and SURROGATE PROGRAM 2 performance normalized to EXISTING IHS A for EXISTING IHS B is equal to 6.3 divided by 2.5 or a normalized runtime performance data result of approximately 2.5 as shown in row 390, column 320. The aggregate of SURROGATE PROGRAM 1 and SURROGATE PROGRAM 2 runtime performance normalized to EXISTING IHS A for EXISTING IHS C is equal to 3.3 divided by 2.5 or a normalized runtime performance data result of approximately 1.3, as shown in row 390, column 330.

The aggregate of SURROGATE PROGRAM 1 and SURROGATE PROGRAM 2 runtime performance normalized to EXISTING IHS A for EXISTING IHS D is equal to 10.4 divided by 2.5 or a normalized runtime performance data value of approximately 4.2, as shown in row 390, column 340. The aggregate of runtime performance data of SURROGATE PROGRAM 1 and SURROGATE PROGRAM 2 normalized to EXISTING IHS A for FUTURE SYSTEM 170 is equal to 14.7 divided by 2.5 or a normalized runtime performance data value of approximately 5.9, as shown in row 390, column 345.

The particular data value of "XN", or the APPLICATION SOFTWARE 175 performance normalized to EXISTING IHS A is shown in row 360, column 345. Designers may generate that particular XN data value using the normalized runtime performance data of FIG. 3. In other words, designers or other entities may generate the particular data value of XN by using a mathematical relationship of the data values of the normalized runtime performance data of FIG. 3. For example, in one embodiment, a least-squares-fit mathematical technique using the normalized runtime performance data values of FIG. 3 may determine the value of XN. In other words, a designer selects the closest matching software program as shown in column 205 in terms of performance data best fit, by using a least-squares-fit mathematical representative technique.

A designer or other entity selects the particular software program of column 305 that most closely matches or fits the performance of APPLICATION SOFTWARE 175 performance normalized to EXISTING IHS A as shown in row 360. Each of the surrogate programs is a candidate for selection as the best fit. Thus, each surrogate program is a candidate surrogate program for selection as being the best fit or most representative of the performance characteristics of APPLICATION SOFTWARE 175 running on FUTURE SYSTEM 170. In one example, the least-squares-fit technique provides designers with a selection of SURROGATE PROGRAM 2 performance normalized to EXISTING IHS A as shown in row 380 as the best fit to APPLICATION SOFTWARE 175 performance normalized to EXISTING IHS A as shown in row 360. In other words, the data of FIG. 3 row 380 for candidate SURROGATE PROGRAM 2 280 most closely matches the data of row 360 for the APPLICATION SOFTWARE 175. In this manner, designers may determine the value of XN as equal to the value of row 380, column 345, namely a normalized runtime performance data value of 11. In other words, since row 380 most closely matches row 360, the designer or other entity populates XN with the data value of 11 from row 390. An XN value of 11 thus represents the normalized performance of APPLICATION SOFTWARE 175 on FUTURE SYSTEM 170.

With the determination of the normalized XN value as equal to 11 in FIG. 3, the designer or other entity may determine the un-normalized value X, namely the runtime performance value of APPLICATION SOFTWARE 175 running on FUTURE SYSTEM 170 in the following manner. Since the normalization of APPLICATION SOFTWARE 175 data, namely that of row 260, uses a value of 10 as the divisor to achieve normalization, that particular value of 10 or the normalization base value enables the determination of X. In other words, multiplying the normalized value of XN=11 by the former divisor 10 yields an un-normalized value that represents the projected performance of APPLICATION SOFTWARE 175 on FUTURE SYSTEM 170. In this example, X is equal to the product of XN, the normalized runtime performance data value of 11 as shown in row 380, column 345, and the particular normalization base value of 10 shown in row 260, column 210 of FIG. 2. In other words, X is equal to 11 times 10 and thus 110 represents the projected runtime performance of APPLICATION SOFTWARE 175 running on FUTURE SYSTEM 170. That data value of X=110 is a projection or prediction and not a precise measurement of actual results. Using the above described methodology, a designer need not execute the actual APPLICATION SOFTWARE 175 on a FUTURE SYSTEM 170 either in real hardware or within a simulation environment to project the runtime value X of the APPLICATION SOFTWARE 175 running on EXISTING IHS A.

Figure 4:
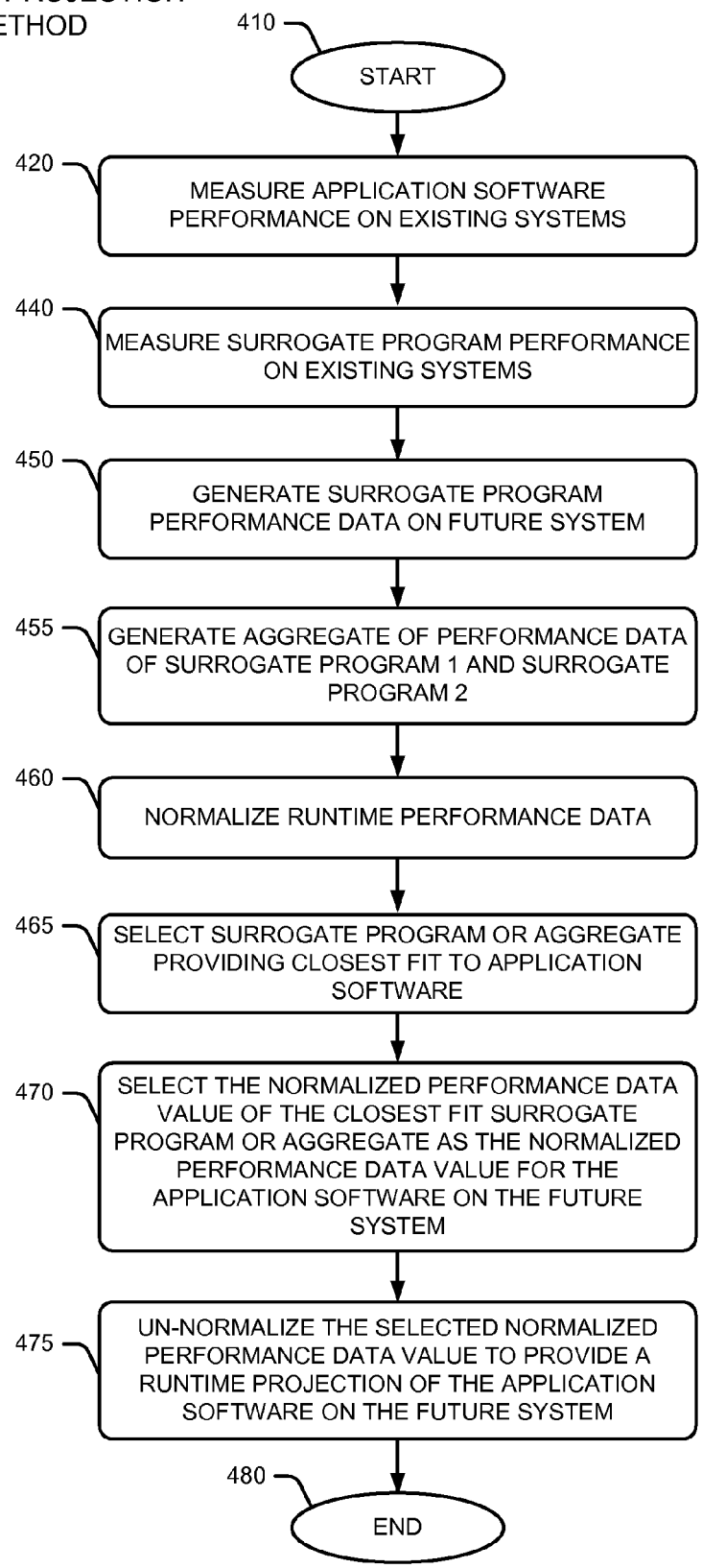
FIG. 4 is a flowchart that depicts a runtime projection method for generating runtime performance estimates of test user application software on a future hardware system or IHS.

FIG. 4 is a flowchart that depicts one method for generating a projection of APPLICATION SOFTWARE 175 performance on FUTURE SYSTEM 170. APPLICATION SOFTWARE functions as workload software, namely a workload. The disclosed runtime projection method starts at block 410. Designers measure the runtime performance of APPLICATION SOFTWARE 175 on existing systems, as per block 420. For example, a customer may provide a user application software program, such as APPLICATION SOFTWARE 175 for testing purposes. A designer or other entities may use APPLICATION SOFTWARE 175 to test runtime performance on multiple existing HW systems or IHSs, such as EXISTING IHS A, EXISTING IHS B, EXISTING IHS C, EXISTING IHS D, and other hardware (HW) system designs not shown. The APPLICATION SOFTWARE 175 executes on multiple HW design systems, namely multiple IHSs, and a respective total runtime per HW design system from start to finish of execution provides the runtime performance data, such as the data in row 260, columns 210, 220, 230, and 240 of FIG. 2.

Designers or other entities measure surrogate program performance on existing systems, as per block 440. In other words, designers execute SURROGATE PROGRAM 1, SURROGATE PROGRAM 2, and the aggregate of runtime performance data of SURROGATE PROGRAM 1 and SURROGATE PROGRAM 2 on EXISTING IHS A, EXISTING IHS B, EXISTING IHS C, and EXISTING IHS D to generate the runtime performance data of FIG. 2 as shown in rows 270, 280, and 290 columns 210, 220, 230, and 240. Using the simulation capability of test system 100, designers generate surrogate program performance data on FUTURE SYSTEM 170, as per block 450. In one example, designers execute SURROGATE PROGRAM 1, SURROGATE PROGRAM 2, and the aggregate of runtime performance data of SURROGATE PROGRAM 1, and SURROGATE PROGRAM 2 on the model of FUTURE SYSTEM 170 in test IHS 102. The results of the runtime simulation provide the runtime performance data for column 245 of FIG. 2. Designers or other entities generate an aggregate of runtime performance data of SURROGATE PROGRAM 1 and SURROGATE PROGRAM 2, as per block 455. Designers may use a geometric means or other technique to generate an aggregate of runtime performance data of SURROGATE PROGRAM 1 and SURROGATE PROGRAM 2 from SURROGATE PROGRAM 1 and SURROGATE PROGRAM 2, as shown in row 290, column 205 of FIG. 2.

Designers or other entities normalize the runtime performance data as shown in FIG. 2, as per block 460. Designers normalize the runtime performance data as shown in FIG. 2 to generate the normalized runtime performance data as shown in FIG. 3. In one example, designers select EXISTING IHS A as the HW system with respect to which they normalize all other performance data. In this manner, all normalized runtime performance data for EXISTING IHS A is set equal to 1 as shown in column 310 of FIG. 3. Designers normalize the remaining data in FIG. 3 with the exception of the unknown XN data that corresponds to APPLICATION SOFTWARE 175 performance normalized to EXISTING IHS A, a shown in row 360, column 345. FIG. 3 thus shows one example of normalized runtime performance data.

From the multiple surrogate programs, designers or other entities select a particular surrogate program or aggregate that provides the closest fit to APPLICATION SOFTWARE 175, as per block 465. Designers or other entities select the normalized performance data value of the closest fit surrogate program or aggregate of surrogate programs as the normalized performance data value for the APPLICATION SOFTWARE 175 on the FUTURE SYSTEM 170, as per block 470. Designers or other entities may determine the XN data value or APPLICATION SOFTWARE 175 performance normalized to EXISTING IHS A data value of FIG. 3 by using a least-squares-fit mathematical technique. The least-squares-fit technique provides designer tools for selection of the surrogate program that most closely fits the performance of APPLICATION SOFTWARE 175 across all systems, as shown per row 360 of FIG. 3. In this example, SURROGATE PROGRAM 2 performance normalized to EXISTING IHS A is the particular surrogate program that best fits that criteria of least-squares-fit. The projected normalized runtime performance data value of 11, as shown in row 380, column 345 provides the XN data value as shown in row 350, column 345 of FIG. 3. In other words XN equals 11.

Designers or other entities un-normalize or de-normalize the selected normalized performance data value to provide a runtime projection of the APPLICATION SOFTWARE 175 on the FUTURE SYSTEM 170, as per block 475. Designers determine the X data value, or APPLICATION SOFTWARE 175 performance projection on FUTURE SYSTEM 170 from the XN data value above. Designers use the normalization base value of 10 from row 260, column 210 of FIG. 2 to adjust or un-normalize the XN value. In other words the XN data value of 11 times the normalization base value of 10 provides the projected un-normalized X value. Multiplying the XN data value of 11 by the normalization base value of 10 equals 110, namely the runtime performance projection X for the APPLICATION SOFTWARE 175 executing on FUTURE SYSTEM 170. This step effectively removes the normalization of the XN value and provides an actual projected raw performance value X. The runtime projection method per FIG. 4 ends, as per block 480. In one embodiment, performance projection system 100 may perform the functions in the blocks of the FIG. 4 flowchart autonomously, or semi-autonomously. Designers or others may configure test IHS 102 to carry out these functions. In other embodiments, designers or others may manually assist in the performance of the functions of the blocks of the FIG. 4 flowchart. Test IHS 102 may store the data of FIGS. 2 and 3 in memory 125 and/or nonvolatile storage 140.

FIG. 5 depicts performance data for HW systems or IHSs, such as EXISTING IHS A and FUTURE SYSTEM 170, that generate runtime performance and microarchitecture dependent hardware counter 107 data. Microarchitecture dependent data includes data from functional units or micro-architectural units of the performance projection system 100 such as EXISTING IHS A or FUTURE SYSTEM 170. Microarchitectural units include caches, branch misprediction units, instruction flush mechanisms, and other units of IHSs. Microarchitecture dependent data includes cache miss rates, branch misprediction counts, instruction flush counts and other data from microarchitecture units. Hardware counter 107 or other memory store, such as system memory 125 or non-volatile storage 140, in processor 105 may store this microarchitecture data. Processor 105 may include multiple other HW counters (not shown) or other storage that stores microarchitecture data.

From a group of existing IHSs such as EXISTING IHS A and EXISTING IHS B or more existing IHSs, designers select an existing IHS, such as EXISTING IHS A. In one embodiment, designers may select any existing IHS. Designers or other entities execute multiple benchmark or software programs, such as APPLICATION SOFTWARE 175, SURROGATE PROGRAM 1, and SURROGATE PROGRAM 2, as shown in column 510 on EXISTING IHS A. More particularly, each application and surrogate software program shown in column 510 may execute on EXISTING IHS A. Each surrogate software program shown in column 510 may execute on FUTURE SYSTEM 170.

During execution of software programs on EXISTING IHS A, designers or other entities collect the runtime performance data results. For example, during execution of APPLICATION SOFTWARE 175 on EXISTING IHS A, designers or other entities collect a runtime performance data value of 15 as shown in row 560, column 515. SURROGATE PROGRAM 1 executing on EXISTING IHS A achieves a runtime performance data result of 20, as shown in row 570, column 515. SURROGATE PROGRAM 2 executing on EXISTING IHS A achieves a runtime performance data result of 10, as shown in row 580, column 515. During execution of software programs, such as APPLICATION SOFTWARE 175, SURROGATE PROGRAM 1, and SURROGATE PROGRAM 2 on EXISTING IHS A, hardware counter 107 maintains a record of performance data. That hardware counter 107 performance data may be microarchitecture dependent data of the particular IHS design under test. For example, APPLICATION SOFTWARE 175 executing on EXISTING IHS A generates hardware counter 107 data that is microarchitecture data unique to EXISTING IHS A. In one embodiment, hardware counter 107 performance data may include cycles per instruction (CPI) data as shown in column 520.

In one example, CPI is a measure of how much time each instruction takes to complete execution in terms of processor cycles. The CPI measure is a good representation of the efficiency of a particular software program running on a HW design system, such as EXISTING IHS A. For example APPLICATION SOFTWARE 175 executing on EXISTING IHS A produces CPI data value of 2.5 as shown in row 560, column 520. SURROGATE PROGRAM 1 executing on EXISTING IHS A produces CPI data value of 4 as shown in row 570, column 520. SURROGATE PROGRAM 2 executing on EXISTING IHS A produces CPI data value of 2 as shown in row 580, column 520.

Hardware counter 107 data may also include microarchitecture dependent data such as cache miss rate data for an L1 cache (not shown) in EXISTING IHS A, like that of L1 cache 109 of test IHS 102, as shown in column 530. APPLICATION SOFTWARE 175, SURROGATE PROGRAM 1, and SURROGATE PROGRAM 2 generate miss rate data for L1 cache (not shown), like L1 cache 109 during execution on EXISTING IHS A, as shown in column 530. The L1 cache miss rate data demonstrates the property of L1 cache to either hit or miss on a memory request during execution of a software program, such as APPLICATION SOFTWARE 175. The L1 cache is a microarchitecture device of EXISTING IHS A, and thus L1 cache miss rate data is microarchitecture dependent data for EXISTING IHS A. In one example, APPLICATION SOFTWARE 175 executing on EXISTING IHS A generates L1 cache miss rate data of 2 as shown in row 560, column 530. SURROGATE PROGRAM 1 executing on EXISTING IHS A generates an L1 cache miss rate data value of 1 as shown in row 570, column 530. SURROGATE PROGRAM 2 executing on EXISTING IHS A generates an L1 cache miss rate data value of 4 as shown in row 580, column 530.

In a manner similar to EXISTING IHS A, test system 100 generates performance data for FUTURE SYSTEM 170. FIG. 5 includes blanks for row 560, columns 540, and 550 if designers or other entities do not execute APPLICATION SOFTWARE 175 on FUTURE SYSTEM 170. A "Z" term in row 560, column 535 represents an unknown value for APPLICATION SOFTWARE 175 runtime performance data for FUTURE SYSTEM 170. Designers or other entities project or predict the "Z" term to provide APPLICATION SOFTWARE 175 performance projection on FUTURE SYSTEM 170 information as described in more detail below. In a simulation environment, test IHS 102 executes SURROGATE PROGRAM 1 and SURROGATE PROGRAM 2 on a virtual copy or design of FUTURE SYSTEM 170. Designers or other entities collect the runtime and hardware counter 107 performance data to populate columns 535, 540 and 550 for SURROGATE PROGRAM 1, and SURROGATE PROGRAM 2 of FIG. 5. For example, during execution of SURROGATE PROGRAM 1 on FUTURE SYSTEM 170, designers collect a runtime performance data result of 30, as shown in row 570, column 535. Designers or others may configure the test IHS formed by processor 105, bus 110 and memory 125 to collect runtime and hardware performance data in hardware counter 107. In actual practice, hardware counter 107 may include multiple hardware counters. Test IHS 102 may store the data of FIGS. 5, 6 and 7 in memory 125 and/or nonvolatile storage 140.

SURROGATE PROGRAM 2 executing on FUTURE SYSTEM 170 generates a runtime performance data result of 20, as shown in row 580, column 535. During execution of SURROGATE PROGRAM 1 and SURROGATE PROGRAM 2 on FUTURE SYSTEM 170, hardware counter 107 maintains a record of hardware counter 107 performance data. That hardware counter 107 performance data may be microarchitecture dependent data of the particular design under test. SURROGATE PROGRAM 1 executing on FUTURE SYSTEM 170 generates a CPI data value of 3 as shown in row 570, column 540. SURROGATE PROGRAM 2 executing on FUTURE SYSTEM 170 generates CPI data value of 1 as shown in row 580, column 540. Test system 100 may store the microarchitecture dependent data or hardware counter performance data in system memory 125 and/or nonvolatile storage 140.

Hardware counter 107 data may also include future system L1 cache (not shown) miss rate data, like that of for L1 cache 109 as shown in column 550. SURROGATE PROGRAM 1, and SURROGATE PROGRAM 2 generate L1 cache miss rate data during execution on FUTURE SYSTEM 170, as shown in column 550. The L1 cache miss rate data demonstrates the property of the L1 cache to either hit or miss on a memory request during execution of APPLICATION SOFTWARE 175. In one example, SURROGATE PROGRAM 1 executing on FUTURE SYSTEM 170 generates an L1 cache miss rate data value of 2 as shown in row 570, column 550. SURROGATE PROGRAM 2 executing on FUTURE SYSTEM 170 generates an L1 cache miss rate data value of 1 as shown in row 580, column 550. Although this example depicts hardware counter 107 records of CPI and L1 cache miss rates, test IHS 102 may record other hardware counter performance and microarchitecture dependent data. For example, hardware counter 107 of test IHS 102 may record system memory 125 reload count data, CPI stack breakdown event count data, or other microarchitecture dependent data.

Designers or other entities generate an aggregate of performance data of SURROGATE PROGRAM 1 and SURROGATE PROGRAM 2 as shown in row 590 of FIG. 5. Designers may use a sum, geometric mean, host fraction, or other technique to generate aggregate of performance data of SURROGATE PROGRAM 1 and SURROGATE PROGRAM 2. In one example, designers generate aggregate of SURROGATE PROGRAM 1 and SURROGATE PROGRAM 2 runtime performance data as shown in row 590 by use of a geometric mean. For example, aggregate of runtime performance data of SURROGATE PROGRAM 1 and SURROGATE PROGRAM 2 produces a runtime performance data value of 15 for EXISTING IHS A as shown in row 590, column 515.

Aggregate of performance data of SURROGATE PROGRAM 1 and SURROGATE PROGRAM 2 produces a CPI data value of 3 for EXISTING IHS A, as shown in row 590, column 520. Aggregate of performance data of SURROGATE PROGRAM 1 and SURROGATE PROGRAM 2 produces an L1 cache miss rate data value of 2.5 for EXISTING IHS A, as shown in row 590, column 530. Aggregate of performance data of SURROGATE PROGRAM 1 and SURROGATE PROGRAM 2 produces a runtime performance data value of 25 for FUTURE SYSTEM 170 as shown in row 590, column 535. Aggregate of performance data of SURROGATE PROGRAM 1 and SURROGATE PROGRAM 2 exhibits a CPI data value of 2 for FUTURE SYSTEM 170, as shown in row 590, column 540.

Aggregate of performance data of SURROGATE PROGRAM 1 and SURROGATE PROGRAM 2 produces an L1 cache miss rate data value of 1.5 for FUTURE SYSTEM 170, as shown in row 590, column 550. The data in row 590 is the result of geometric mean or averaging the data in SURROGATE PROGRAM 1 row 570 and SURROGATE PROGRAM 2 row 580 data. The result is a unique set of runtime and hardware counter 107 data for the aggregate of performance data of SURROGATE PROGRAM 1 and SURROGATE PROGRAM 2. Designers are not limited to two surrogate programs, such as SURROGATE PROGRAM 1 and SURROGATE PROGRAM 2. In practice, the disclosed methodology may employ more than two surrogate programs. In other words, designers may select multiple benchmark software programs, or other software programs (not shown) beyond the two surrogate programs that representative performance projection system 100 employs. Designers may generate multiple other aggregates of combinations of surrogate programs (not shown) to provide more performance data for analysis.

FIG. 6 depicts normalized performance data from the data results of FIG. 5. For example, the normalized performance data of FIG. 6 demonstrates the results of normalization in reference to EXISTING IHS A runtime, or column 515 of FIG. 5. In other words, designers or other entities normalize the data of EXISTING IHS A runtime in column 615 to all 1's. Designers or other entities normalize the remaining data of FIG. 5 in reference to the data in column 515 or EXISTING IHS A runtime performance data. The normalized data of FIG. 6 reflects the performance data from each software application program of column 610. Column 610 includes the software application programs APPLICATION SOFTWARE 175, SURROGATE PROGRAM 1, SURROGATE PROGRAM 2, and the aggregate of performance data of SURROGATE PROGRAM 1 and SURROGATE PROGRAM 2.

Column 620 of FIG. 6 shows EXISTING IHS A performance data of column 520 of FIG. 5 normalized to EXISTING IHS A runtime data of column 515 of FIG. 5. Column 620 shows EXISTING IHS A CPI data of 0.2, 0.2, 0.2, and 0.2 normalized to EXISTING IHS A runtime data. Column 630 shows EXISTING IHS A L1 cache miss rate data of 0.1, 0.1, 0.4, and 0.2 normalized to EXISTING IHS A runtime data. Column 635 shows FUTURE SYSTEM 170 runtime data of ZN, 1.5, 2, 1.7 normalized to EXISTING IHS A runtime data. "ZN" represents the normalized data value for Z, or the normalized data value for APPLICATION SOFTWARE 175 runtime performance data for FUTURE SYSTEM 170. Column 640 shows FUTURE SYSTEM 170 CPI data of blank/null, 0.2, 0.1, and 0.1 normalized to EXISTING IHS A runtime data. In one embodiment, designers do not measure the FUTURE SYSTEM 170 CPI data for APPLICATION SOFTWARE 175 thus resulting in a blank or no data value result (blank/null). Column 650 shows FUTURE SYSTEM 170 190 L1 cache miss rate data of blank/null, 0.1, 0.1, and 0.1 normalized to EXISTING IHS A runtime data. In one embodiment, designers or other entities perform no measure of the FUTURE SYSTEM 170 190 L1 cache miss rate data for APPLICATION SOFTWARE 175, resulting in a blank or no data value result (blank/null).

Figure 7:
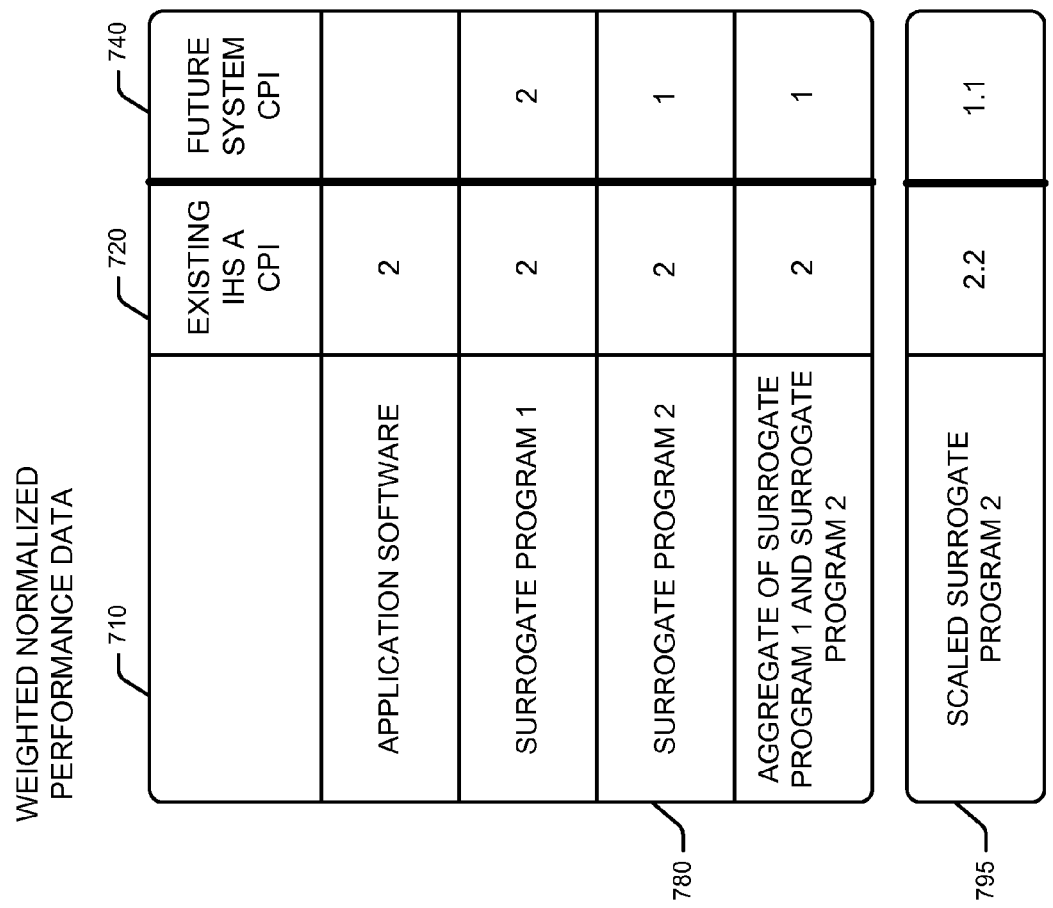
FIG. 7 shows an example of weighted normalized performance data from the normalized performance data of FIG. 6.

FIG. 7 depicts weighted normalized performance data from the data results of FIG. 6. Column 710 depicts the software application programs APPLICATION SOFTWARE 175, SURROGATE PROGRAM 1, SURROGATE PROGRAM 2, and the aggregate of performance data of SURROGATE PROGRAM 1 and SURROGATE PROGRAM 2. Designers or other entities may weight a particular performance data result, such as the normalized performance data for EXISTING IHS A CPI results, shown in column 620 of FIG. 6. Designers or other entities may multiply the entire data of column 620 of FIG. 6 normalized performance data by a weighting factor to obtain weighted normalized performance data. For example, designers or other entities may choose a weighting factor of 10 to increase the effective weight or relative strength of a particular data grouping or column of normalized performance data. In one example, column 720 shows the results of multiplying the normalized performance data column 620 in FIG. 6 by a weighting factor of 10. Column 720 shows the weighted normalized performance data for EXISTING IHS A CPI data of 2, 2, 2 and 2. Column 740 shows the weighted normalized performance data for FUTURE SYSTEM 170 CPI data of blank/null, 2, 1 and 1.

Designers or other entities may scale a particular surrogate program result to adjust the respective weighted normalized performance data. For example, row 795 shows the SCALED SURROGATE PROGRAM 2 results of a 10 percent increase or the 10 percent scaled results of the data of SURROGATE PROGRAM 2 in row 780. Row 795 shows the SCALED SURROGATE PROGRAM 2 results of 2.2 and 1.1 for EXISTING IHS A and FUTURE SYSTEM 170 weighted normalized CPI performance data, respectively. As shown in more detail in FIG. 8 below, the weighted normalized CPI performance data provides designers with a method to determine the normalized runtime projection performance data of APPLICATION SOFTWARE 175 executing on FUTURE SYSTEM 170 or ZN. Designers or other entities may un-normalize the ZN data value to provide the runtime performance projection of APPLICATION SOFTWARE 175 executing on FUTURE SYSTEM 170 or Z as shown below.

Figure 8:
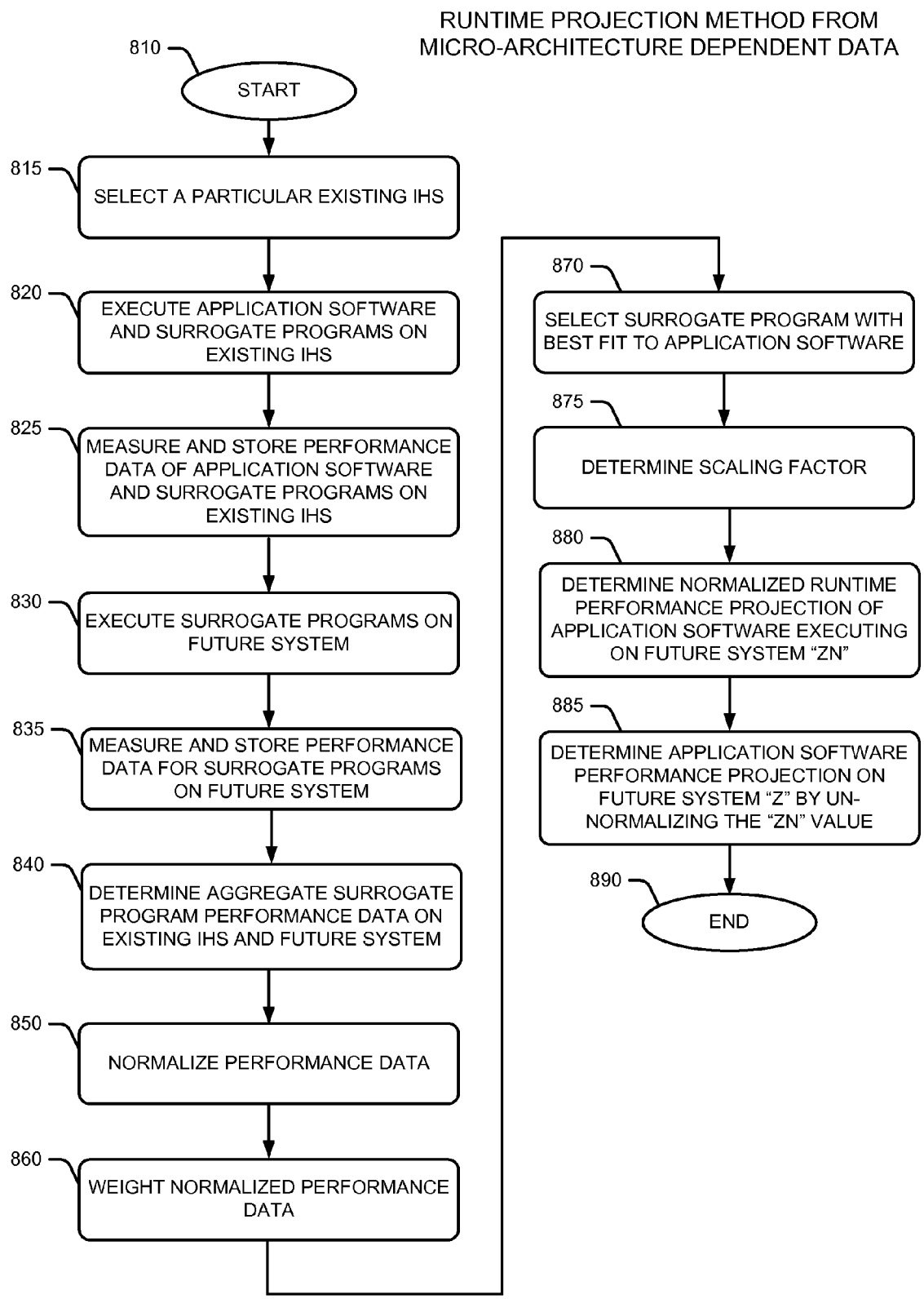
FIG. 8 is a flowchart that depicts a runtime projection method from microarchitecture dependent data for execution of application software on a future system.

FIG. 8 is a flowchart that depicts a method of generating a projection of APPLICATION SOFTWARE 175 performance on an IHS such as FUTURE SYSTEM 170 using hardware counter 107 that may record or store microarchitecture dependent data. The runtime projection method starts, as per block 810. From a group of existing hardware (HW) IHSs, or existing IHSs, designers select an existing IHS, such as EXISTING IHS A, as per block 815. Using EXISTING IHS A as the existing HW design system, designers execute APPLICATION SOFTWARE 175 and the surrogate programs, namely SURROGATE PROGRAM 1, and SURROGATE PROGRAM 2 on EXISTING IHS A, as per block 820. During that exercise or execution, designers or other entities collect the runtime data such as runtime performance data shown in rows 560, 570, and 580, column 515 of FIG. 5. For example, the respective runtime data for APPLICATION SOFTWARE 175, SURROGATE PROGRAM 1, and SURROGATE PROGRAM 2 executing on EXISTING IHS A is 15, 20, and 10 as shown in column 515. Designers or other entities measure the performance of APPLICATION SOFTWARE 175 and surrogate programs, such as SURROGATE PROGRAM 1 and SURROGATE PROGRAM 2, on an existing IHS such as EXISTING IHS A, as per block 825.

During the execution of APPLICATION SOFTWARE 175, SURROGATE PROGRAM 1, and SURROGATE PROGRAM 2, hardware counter 107 records CPI data and L1 cache miss rate data in respective columns 520 and 530 data of FIG. 5. For example, the respective CPI data for APPLICATION SOFTWARE 175, SURROGATE PROGRAM 1, and SURROGATE PROGRAM 2 executing on EXISTING IHS A is 2.5, 4, and 2 as shown in column 520. The respective L1 cache miss rate data for APPLICATION SOFTWARE 175, SURROGATE PROGRAM 1, and SURROGATE PROGRAM 2 executing on EXISTING IHS A are 2, 1, and 4, respectively, as shown in column 530 of FIG. 5. Designers or other entities execute surrogate programs, namely SURROGATE PROGRAM 1, and SURROGATE PROGRAM 2 on FUTURE SYSTEM 170, as per block 830. During execution of SURROGATE PROGRAM 1, and SURROGATE PROGRAM 2 on FUTURE SYSTEM 170, designers or other entities measure surrogate program performance data, as per block 835. To achieve this, designers, using the simulation capabilities of test system 100, execute all surrogate programs, such as SURROGATE PROGRAM 1 and SURROGATE PROGRAM 2 on FUTURE SYSTEM 170. Designers record runtime performance, CPI, and L1 cache miss rate data from the results of test system 100 simulation of FUTURE SYSTEM 170.

Columns 535, 540 and 550 show the results of surrogate program performance. For example, the respective runtime data for APPLICATION SOFTWARE 175, SURROGATE PROGRAM 1, and SURROGATE PROGRAM 2 executing on FUTURE SYSTEM 170 is Z, 30, and 20 as shown in column 535. At this point in time, the Z runtime result is undetermined, and will be described in more detail below.

The CPI data for SURROGATE PROGRAM 1, and SURROGATE PROGRAM 2 executing on FUTURE SYSTEM 170 are respectively 3 and 1, as shown in column 540. The respective L1 cache miss rate data for SURROGATE PROGRAM 1, and SURROGATE PROGRAM 2 executing on FUTURE SYSTEM 170 is 2, and 1 as shown in column 550. Designers or other entities generate aggregate surrogate program performance data, as per block 840. By using the performance data of SURROGATE PROGRAM 1 and SURROGATE PROGRAM 2, designers may generate an aggregate or merging of the two surrogate program results.

More particularly, designers may generate an aggregate, such as aggregate of performance data of SURROGATE PROGRAM 1 and SURROGATE PROGRAM 2, as shown in row 590 using simple geometric averaging or other means. For example, the performance data for aggregate of SURROGATE PROGRAM 1 and SURROGATE PROGRAM 2 on EXISTING IHS A and FUTURE SYSTEM 170 is shown in row 590. The aggregate data for runtime, CPI, and L1 cache miss rate are respectively 15, 3, 2.5, 25, 2, and 1.5 for EXISTING IHS A and FUTURE SYSTEM 170. Although one aggregate, namely aggregate of performance data of SURROGATE PROGRAM 1 and SURROGATE PROGRAM 2 is shown in this example, designers may generate many other aggregate results (not shown) for other averaging techniques of surrogate programs. Designer may use combinations of averaging surrogate program data with aggregate program data, and other techniques to generate aggregate programs.

Designers or other entities normalize the performance data, as per block 850. Designers normalize the performance data of FIG. 5 generating the normalized performance data of FIG. 6 to properly compare EXISTING IHS A and FUTURE SYSTEM 170 results. In other words, designers compare EXISTING IHS A and FUTURE SYSTEM 170 performance results by normalizing all data of FIG. 5. In one embodiment of the disclosed method, designers may place a weighting scheme on the particular normalized performance data of FIG. 6 to generate weighted normalized performance data of FIG. 7 to provide better strength or weight of one particular metric over another. Designers weight the normalized performance data, as per block 860. For example designers may multiply the CPI data in columns 520 and 540 by a weighting factor W to generate a weight of W times more strength to the CPI performance data of columns 520 and 540. Designers may use a distance matrix such as the Euclidian distance measure to adjust performance data results. Designers may use other weighting factors and techniques to adjust the relative weight or strength of each performance data type as shown in FIG. 5 row 555. Applying normalization and weighting techniques to the performance data of FIG. 5 offers designers one method to select a surrogate program that best matches the performance of APPLICATION SOFTWARE 175 on FUTURE SYSTEM 170.

Designers select one surrogate program from the surrogate programs as shown in FIG. 5 that best fits the performance results of APPLICATION SOFTWARE 175, as per block 870. Designers may use any means of comparison between the performance data results of APPLICATION SOFTWARE 175 on EXISTING IHS A and FUTURE SYSTEM 170 and each surrogate program to find a best fit. Designers determine a scaling factor, as per block 875. The scaling factor provides an offset or comparison between APPLICATION SOFTWARE 175 and the selected surrogate program, namely SURROGATE PROGRAM 2, such as the SCALED SURROGATE PROGRAM 2 data in row 795 of FIG. 7.

Designers determine the APPLICATION SOFTWARE 175 performance projection on FUTURE SYSTEM 170, as per block 885. Designers use the scaling factor to generate the runtime performance projection data for APPLICATION SOFTWARE 175 executing on FUTURE SYSTEM 170. For example, using a scaling factor of 10 percent, designers determine the APPLICATION SOFTWARE 175 performance projection on FUTURE SYSTEM 170 as 10 percent greater than the runtime performance of SURROGATE PROGRAM 2 on FUTURE SYSTEM 170. In that case the normalized runtime performance data of APPLICATION SOFTWARE 175 executing on FUTURE SYSTEM 170 (ZN) is 10 percent greater than 2, or the normalized runtime performance data of SURROGATE PROGRAM 2 executing on FUTURE SYSTEM 170.

The normalized runtime performance projection of APPLICATION SOFTWARE 175 executing on FUTURE SYSTEM 170 or ZN is equal to 2.2, as per block 880. From the ZN value, designers or other entities determine the runtime performance projection for APPLICATION SOFTWARE 175 executing on FUTURE SYSTEM 170 by un-normalizing or de-normalizing the ZN value, as per block 885. The un-normalized runtime performance projection for APPLICATION SOFTWARE 175 executing on FUTURE SYSTEM 170 "Z" is 10 percent greater than 20 or equal to 22. In this example the runtime performance projection APPLICATION SOFTWARE 175 executing on FUTURE SYSTEM 170 is 22. The runtime projection method ends, as per block 890. In one embodiment, test system 100 may perform the functions in the blocks of the FIG. 8 flowchart autonomously, or semi-autonomously. Designers or others may configure test system 100 to carry out these functions. In other embodiments, designers or others may assist in the performance of the functions of the blocks of the FIG. 8 flowchart.

The foregoing discloses methodologies wherein an performance projection system employs application software to provide IC design personnel with IC design system tools for simulation, design benchmarking, and other analysis. In one embodiment, designers initiate execution of multiple programs including application software and surrogate programs to generate performance runtime data for future and existing systems. Designers may normalize and evaluate performance runtime data to generate a runtime projection for future system performance.

The foregoing also discloses methodologies wherein a performance projection system employs a hardware counter to collect runtime performance and microarchitecture performance data. The performance projection system employs a future system simulation and existing system test for surrogate program testing. The test system executes application software to provide IC design personnel with runtime performance and microarchitecture data for design benchmarking, and other analysis. In one embodiment, designers execute the surrogate program and application software on the existing system to generate runtime and HW counter data. Designers may normalize and weight the runtime and HW counter data to provide enable a selection of particular surrogate program most similar to the application software. Designers may apply a scaling factor to surrogate program performance results to determine a runtime projection for future system from the particular surrogate program data.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts.

For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of performance testing, comprising:
   selecting an existing information handling system (IHS), thus providing a selected existing IHS;
   providing a user software program and first and second surrogate software programs;
   executing the user software program on the selected existing IHS, thus producing a runtime result and a microarchitecture dependent data result;
   executing the multiple surrogate programs on the selected existing IHS to generate a runtime result and a microarchitecture data dependent result;
   executing the multiple surrogate programs on a future IHS virtualization of the future IHS, each of the multiple surrogate programs exhibiting a respective runtime performance result; and
   determining a projected runtime result for the executing of the user software program on the future IHS from runtime results and microarchitecture data dependent results of executing the multiple surrogate programs on the selected existing IHS and the runtime performance results of executing the multiple surrogate programs on the virtualization of the future IHS.

2. The method of claim 1, wherein the determining step further comprises normalizing the runtime results and microarchitecture dependent data results of executing the user application software and multiple surrogate programs on the selected existing IHS with respect to the runtime results, thus providing normalized results.

3. The method of claim 2, further comprising weighting the normalized results, thus providing weighted results.

4. The method of claim 3, further comprising scaling the weighted results, thus providing scaled weighted results.

5. The method of claim 1, wherein the microarchitecture dependent data result of executing the user software program in the selected existing IHS includes cycles per instruction (CPI) data.

6. The method of claim 1, wherein the microarchitecture dependent data result of executing the user software program in the selected existing IHS includes cache miss rate data.

7. The method of claim 2, further comprising comparing normalized results of executing the multiple surrogate programs on the selected existing system with the normalized results of executing the user application software of the selected existing system, to select one of the multiple surrogate programs whose respective normalized results most closely matches the normalized results of the user application software, thus designating a selected surrogate program.

8. The method of claim 7, further comprising selecting the normalized runtime data of the selected surrogate software program executing on the future virtualized IHS as representing projected runtime data for the user software application on the future IHS.

9. The method of claim 1, further comprising storing the future virtualized IHS in a non-volatile storage.

10. The method of claim 1, further comprising storing the future virtualized IHS in a memory.

11. A performance projection system comprising:
    a currently existing information handling system (IHS);
    a test information handling system (IHS), the test IHS including:
    a processor;
    a memory coupled to the processor, the memory storing a future virtualized IHS;
    a user application program that executes on the currently existing IHS;
    first and second surrogate programs that execute on the currently existing IHS and the future virtualized IHS;
    wherein the test IHS is configured to:
    store a runtime result and a microarchitecture dependent data result as the user software program executes on the currently existing IHS;
    store runtime data for the first surrogate software program as the first surrogate software program executes on the currently existing IHS and the future virtualized IHS;
    store runtime data for the second surrogate software program as the second surrogate program executes on the currently existing IHS and the future virtualized IHS;
    normalize the runtime data for the user software program and the first and second surrogate software programs with respect to runtime data of the currently existing IHS, thus providing normalized runtime data; and
    compare the normalized runtime data for the first and second surrogate software programs with respect to the normalized runtime data of the user software program to determine a best fit surrogate software program.

12. The performance projection system of claim 11, wherein the test system is further configured to store a microarchitecture dependent data result as the user application program executes on the currently existing IHS.

13. The performance projection system of claim 11, wherein the test system is further configured to store a microarchitecture dependent data result as the first surrogate program executes on the currently existing IHS.

14. The performance projection system of claim 11, wherein the test system is further configured to store a microarchitecture dependent data result as the second surrogate program executes on the currently existing IHS.

15. The performance projection system of claim 11, wherein the test system is further configured to normalize the runtime results and microarchitecture dependent data results of executing the user application software and multiple surrogate programs on the currently existing IHS with respect to the runtime results, thus providing normalized results.

16. The performance projection system of claim 15, wherein the test system is further configured to weight the normalized results, thus providing weighted results.

17. The performance projection system of claim 16, wherein the test system is further configured to scale the weighted results, thus providing scaled weighted results.

18. The performance projection system of claim 11, wherein the microarchitecture dependent data result of executing the user software program on the currently existing IHS includes one of cycles per instruction (CPI) data and cache miss data.

19. The performance projection system of claim 15, wherein the test system is further configured to compare normalized results of executing the multiple surrogate programs on the currently existing system with the normalized results of executing the user application software of the currently existing system, to select one of the multiple surrogate programs whose respective normalized results most closely matches the normalized results of the user application software, thus designating a selected surrogate program.

20. The performance projection system of claim 19, wherein the test system is further configured to select the normalized runtime data of the selected surrogate software program executing on the future virtualized IHS as representing projected runtime data for the user software application on the future IHS.

* * * * *